Feb. 5, 1946.        P. M. FREER        2,393,980
BRAKE
Filed Feb. 16, 1944        2 Sheets-Sheet 1

INVENTOR.
PHELPS M. FREER
BY
ATTORNEYS

Feb. 5, 1946.     P. M. FREER     2,393,980
BRAKE
Filed Feb. 16, 1944     2 Sheets-Sheet 2

INVENTOR.
PHELPS M. FREER
BY
ATTORNEYS

Patented Feb. 5, 1946

2,393,980

UNITED STATES PATENT OFFICE 2,393,980

BRAKE

Phelps M. Freer, Detroit, Mich.

Application February 16, 1944, Serial No. 522,635

4 Claims. (Cl. 188—78)

The invention relates to brakes and refers more particularly to brakes of that type having a brake drum and an internal brake member engageable with the drum.

The invention has for an object to provide an improved brake of relatively simple construction.

The invention has for another object to so construct the brake that the brake member is movable against and away from the brake drum by means comprising a resilient member.

The invention has for further objects to so construct the brake that the resilient member is bowed; and to so construct the brake that the brake member has separable ends and the resilient member normally exerts a force on one end of the brake member tending to move the same generally circumferentially and radially of the drum.

These and other objects of the invention will become apparent from the following description, taken in connection with the accompanying drawings, in which.

Figure 1:
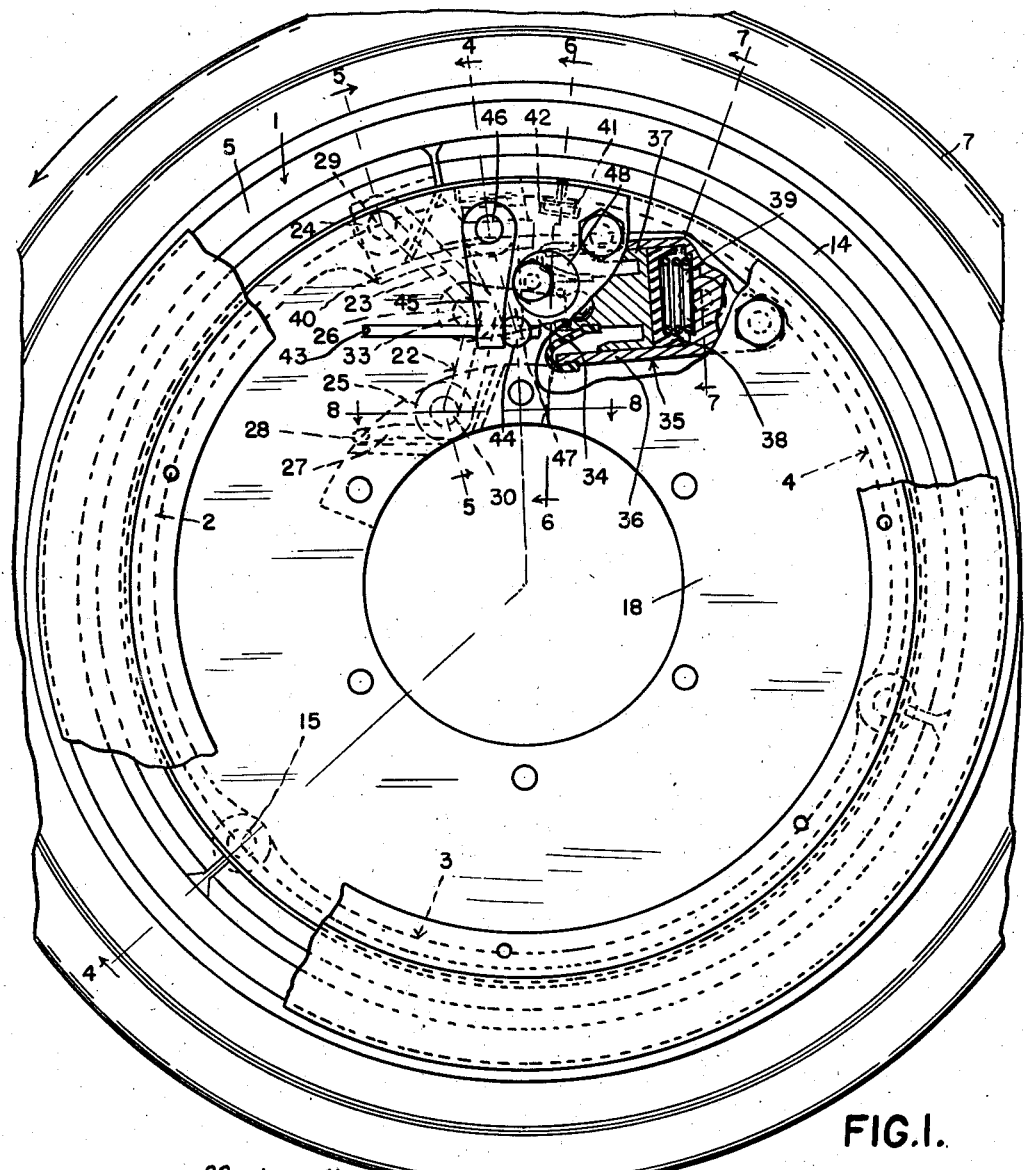
Figure 1 is an inboard elevation, partly broken away and with the wheel support omitted, of a brake embodying the invention.
Figure 1A:
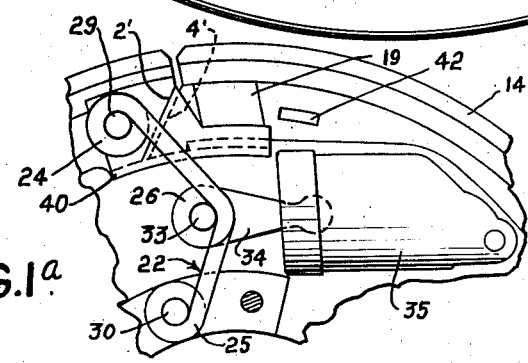
Figure 1A is an inboard elevation, with the backing plate omitted, of a portion of the brake.
Figure 4:
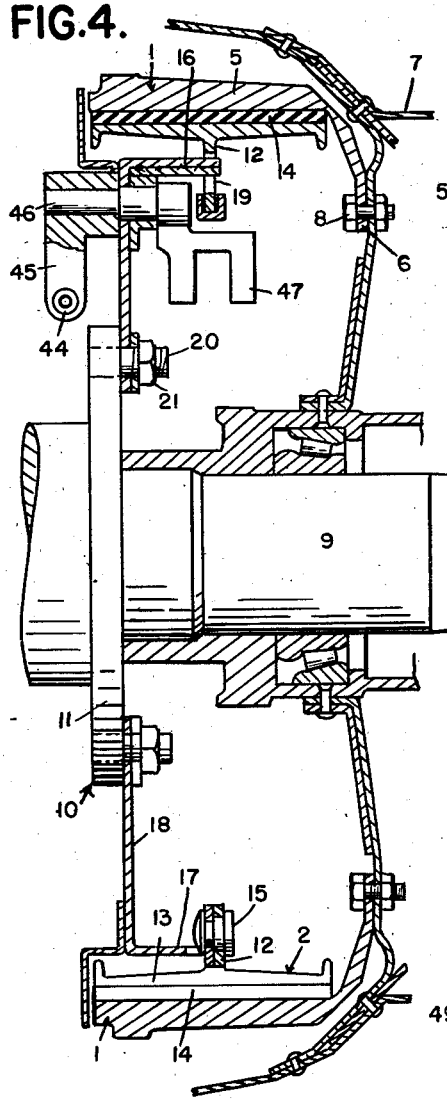
Figure 2:
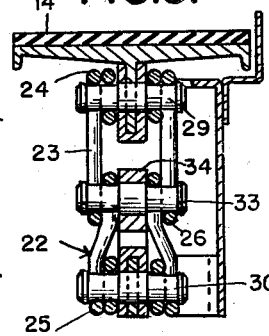
Figures 2 and 3 are edge elevations, partly broken away.
Figures 5, 7:
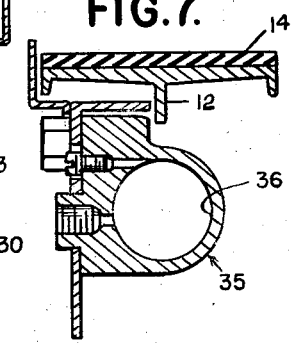
Figures 6, 8:
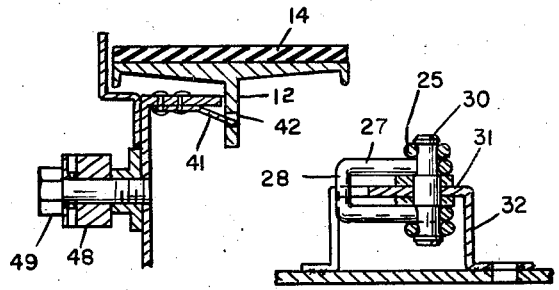
Figure 3:
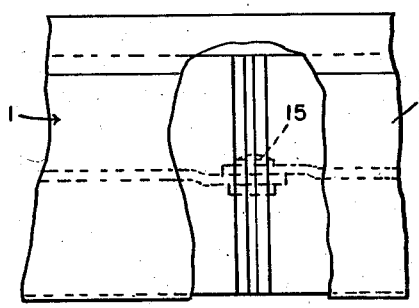

Figures 4, 5, 6, 7 and 8 are cross sections on the lines 4—4, 5—5, 6—6, 7—7 and 8—8, respectively, of Figure 1.

The brake comprises the brake drum 1 and an internal brake member having separable ends and formed of the brake shoes 2, 3 and 4 arranged in end to end relation and engageable with the annular brake flange 5 of the drum. The drum has at the outboard edge of its brake flange the radially inwardly extending flange 6 which is adapted to be attached to or mounted on the wheel 7 by suitable means, such as the bolts 8. The wheel is journaled on the axle 9 of the stationary support 10 which has the fixed radial flange 11. The wheel normally rotates in the direction of the arrow in Figure 1.

The brake shoes 2, 3 and 4 have T-section bodies with the webs 12 and the axial flanges 13, to which latter the brake linings 14 are secured. The brake shoe 2 is pivotally connected to the brake shoe 3 and the brake shoe 3 is pivotally connected to the brake shoe 4 by the rivets 15 which extend through axially offset end portions of the webs 12 of the brake shoes. The brake shoes are anchored by the anchor 16 located at the normally trailing end of the brake shoe 4. The anchor is preferably a projection extending axially in an outboard direction from the peripheral flange 17 of the backing plate 18 and the anchor extends through the generally radial opening 19 in the normally trailing end of the web 12 of the brake shoe 4, the opening providing for the necessary generally radial movement of the normally trailing end of the brake shoe 4 to engage or clear the brake flange 5 of the drum. The projection is preferably reenforced by welding a plate thereto. The backing plate 18 is fixedly secured to the radial flange 11 by suitable means, such as the bolts 20 and nuts 21.

For moving the normally leading end of the brake shoe 2 against the brake flange 5 of the drum, I have provided the resilient bowed member 22 which is operatively connected to the normally leading end of the brake shoe 2 and also to the backing plate 18 and is bowed in the direction opposite to that of the normal rotation of the drum. The operative connections are in different radial planes of the brake with the operative connection between the resilient member and the brake shoe positioned with respect to the radial plane of the operative connection between the resilient member and the backing plate in a radial plane located angularly or circumferentially in the direction opposite to that of the normal rotation of the drum so that when the bow is flattened the movement imparted to the normally leading end of the brake shoe 2 has a considerable radial component. The resilient bowed member, as shown in the present instance, is a wire spring and has the bowed portions 23 each of which has the coils 24 and 25 at its ends and the coil 26 at substantially its middle. The resilient bowed member also has the integral U-shaped portion 27 formed with a leg extending from each coil 25 and a transverse part 28 connecting each leg. 29 is a pin extending transversely through the normally leading end of the web 12 of the brake shoe 2 and having its end portions extending through the coils 24. 30 is a pin extending substantially parallel to the pin 29 transversely through the web 31 of the channel-shaped bracket 32 which has its foot flanges suitably secured to the backing plate 18 as by being welded thereto. The pin 30 has its end portions extending through the coils 25. 33 is another pin extending substantially parallel to the pins 29 and 30 and having its end portions extending through the coils 26. The pin 33 also extends through the free end of the piston rod 34 which is located between the coils 26. The portions of the pins 29, 30 and 33 engaged by the coils are reduced to form necks so that the pins and coils are properly positioned axially of the brake. The piston rod 34 forms part of the fluid pressure operated actuator or wheel cylinder 35 which comprises the cylinder 36 mounted on the backing plate 18, the piston 37 slidable within the cylinder and the piston rod 34. A suitable sealing cup 38 is preferably provided within the cylinder 36 and resiliently held against the head of the piston 37 by the coil spring 39.

To move the normally trailing end of the brake shoe 4 against the brake flange of the drum, the channel-shaped member 40 is fixedly secured to the normally leading end of the web 12 of the brake shoe 2. The channel-shaped member embraces and extends circumferentially beyond the normally leading end and also embraces the normally trailing end of the web 12 of the brake shoe 4. The bottom of the channel-shaped member is concentric with the brake shoes and is engageable with the radially inner edge of the web of the brake shoe 4 so that when the normally leading end of the brake shoe 2 is moved against the brake flange 5 of the drum the channel-shaped member moves the normally trailing end of the brake shoe 4 against the brake flange of the drum. As shown in the present instance, the normally leading end of the web of the brake shoe 2 and the normally trailing end of the web of the brake shoe 4 are formed with enlargements having their adjacent edges 2' and 4', respectively beveled and arranged so that the enlargement of the web of the brake shoe 4 extends radially inside the enlargement of the web of the brake shoe 2.

In operation, when braking fluid is forced into the fluid pressure operated actuator or wheel cylinder 35 the resilient bowed member 22 is flattened and acts upon the normally leading end of the brake shoe 2 to move the same generally radially outwardly and away from the normally trailing end of the brake shoe 4. Also the channel-shaped member 40 moves the normally trailing end of the brake shoe 4 generally radially outwardly in a direction as determined by the anchor 16 engaging the side edges of the opening 19.

To retract the normally leading end of the brake shoe 2, the transverse part 28 of the U-shaped portion 27 of the resilient bowed member 22 is positioned to abut the side wall of the channel-shaped bracket 32. The arrangement is such that the coils 25 are subjected to torsion and the legs of the U-shaped portion 27 and also the parts of the bowed portion 23 adjacent the coils 25 are flexed during the flattening of the bowed portion so that when the pressure of the braking fluid is relieved the coils, the legs and the parts return to their normal positions because of their inherent resiliency and serve to move the normally leading end of the brake shoe 2 generally circumferentially and radially inwardly. To retract the normally trailing end of the brake shoe 4, the secondary leaf spring 41 is fixedly secured to the backing plate 18 and extends through the opening 42 in the normally trailing end of the web 12 of the brake shoe 4 and abuts the radially inner edge of the opening. As a result, the secondary leaf spring serves to retract the normally trailing end of the brake shoe 4 in a generally radial direction, as determined by the anchor 16 and the opening 19. The secondary leaf spring also serves to hold the normally trailing end of the brake shoe 4 against the channel-shaped member 40. It will be seen that the retraction of the two ends of the brake shoes 2 and 4 serves to effect the retraction also of the intermediate brake shoe 3.

The brake may also be applied mechanically by means of the cable 43 which has the ball 44 secured thereto. The ball abuts the outside lever 45 fixed upon the shaft 46 journaled in the backing plate 18. 47 is a second lever also fixed upon the shaft and located within the brake and engageable with the coils 26, the construction being such that upon pulling the cable 43 the lever 45 is swung, the shaft 46 is rotated, and the lever 47 is swung to flatten the resilient bowed member 22.

48 is an eccentric stop rotatively adjustably secured to the backing plate 18 by means of the cap bolt 49 threaded to the backing plate. The eccentric is engageable with the outside lever 45 when the latter is in its retracted position.

What I claim as my invention is:

1. A brake comprising a brake drum, an internal brake member, a stationary member and means for moving said brake member against said drum comprising a spring having coils near its ends and an intermediate coil, an actuating rod, pins extending through said first mentioned coils for operatively connecting said spring to said brake member and stationary member and another pin extending through said intermediate coil for operatively connecting said spring to said actuating rod, said pins having reduced portions forming necks encircled by said coils to position said coils axially with respect to said pins.

2. In a brake, the combination with a brake drum, an internal brake member and a stationary member; of operating means therefor including means forming in effect a toggle lever extending in a generally radial direction with respect to said brake drum with its inner and outer ends pivotally connected respectively to said stationary member and brake member and having a normally laterally offset knee portion resiliently restrained from bending and actuating means engaging said knee portion to rock said toggle lever means as a unit about its stationary pivot thereby moving said brake member into frictional contact with said drum and under braking load bending said knee portion to effect a toggle lever action.

3. In a brake, the combination with a brake drum, an internal brake member and a stationary member; of operating means therefor including a resilient member forming in effect a toggle lever extending in a generally radial direction with respect to said brake drum with its inner and outer ends pivotally connected respectively to said stationary member and brake member, said resilient member being fashioned to have a normally laterally offset knee portion and the resiliency being such as to normally restrain said knee from bending and actuating means engaging said knee portion to rock said resilient member about its stationary pivot without bending the knee to move said brake member into frictional contact with said drum and the further movement of said actuating means under braking load bending said knee to effect a toggle lever action.

4. In a brake, the combination with a brake drum, an internal brake member and a stationary member; of a resilient toggle lever member formed of a rod return bent to have substantially parallel spaced leg portions with three coils in each leg located respectively adjacent to said return bend, adjacent the opposite and intermediate said ends, the intermediate coils being laterally offset from the end coils, pins engaging the opposite end coils to pivotally connect the same respectively with said stationary member and brake member with said legs extending in a generally radial direction with respect to said brake drum, a pin engaging said intermediate coils and an actuator connected to the latter pin for rocking said resilient member as a unit about said stationary pin thereby moving said brake member into frictional contact with said drum and under braking load bending said member about said intermediate coils to effect a toggle lever action

PHELPS M. FREER.